US006952498B2

(12) United States Patent
Ishikura

(10) Patent No.: US 6,952,498 B2
(45) Date of Patent: Oct. 4, 2005

(54) FACE PORTION DETECTING APPARATUS

(75) Inventor: Hisashi Ishikura, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 667 days.

(21) Appl. No.: 09/987,638

(22) Filed: Nov. 15, 2001

(65) Prior Publication Data

US 2002/0181774 A1 Dec. 5, 2002

(30) Foreign Application Priority Data

May 30, 2001 (JP) ....................................... 2001-162079

(51) Int. Cl.[7] ................................................ G06K 9/46
(52) U.S. Cl. ...................................................... 382/190
(58) Field of Search ......................... 382/103, 117–118, 382/190, 203, 254, 275; 348/77–78; 396/18; 351/206–207

(56) References Cited

U.S. PATENT DOCUMENTS

| | | | | | |
|---|---|---|---|---|---|
| 4,768,088 | A | * | 8/1988 | Ando | 348/77 |
| 5,293,427 | A | * | 3/1994 | Ueno et al. | 382/103 |
| 5,598,145 | A | * | 1/1997 | Shimotani et al. | 340/576 |
| 5,614,967 | A | * | 3/1997 | Ishikawa et al. | 351/210 |
| 5,621,457 | A | * | 4/1997 | Ishiwaka et al. | 348/78 |
| 5,801,763 | A | * | 9/1998 | Suzuki | 348/77 |
| 6,055,322 | A | * | 4/2000 | Salganicoff et al. | 382/117 |
| 6,252,977 | B1 | * | 6/2001 | Salganicoff et al. | 382/117 |

FOREIGN PATENT DOCUMENTS

| | | | |
|---|---|---|---|
| JP | 6-270711 | 9/1994 | B60K/28/06 |
| JP | 9-21611 | 1/1997 | G01B/11/00 |
| JP | 9-81756 | 3/1997 | G06T/7/60 |
| JP | 10-216234 | 8/1998 | A61M/21/00 |

* cited by examiner

*Primary Examiner*—Daniel Miriam
(74) *Attorney, Agent, or Firm*—Sughrue Mion, PLLC

(57) ABSTRACT

In a face portion detecting apparatus, an image of an eye portion of a car driver can be properly extracted without adverse influences caused by a reflection image reflected from a luster reflection surface of spectacles worn by the car driver. The face portion detecting apparatus is arranged by a light source of an illumination for illuminating a face portion of a human being from different directions from each other; a camera for photographing the face portion which is illuminated by the light source; an illumination lighting control unit for controlling turn-ON operation of the light source; a camera control unit for controlling the camera in synchronism with the turn-ON operation of the illumination light source; and a retina reflection detecting unit for removing a reflection image of an article having a luster reflection surface by employing at least one image which is acquired by the camera in synchronism with the turn-ON operation of the illumination light source, whereby only a determined face portion is extracted.

11 Claims, 11 Drawing Sheets

FACE PORTION DETECTING APPARATUS

This application is based on Application No. 2001-162079, filed in Japan on May 30, 2001, the contents of which are hereby incorporated by reference.

BACKGROUND OF THE INVENTION

1. Field of the Invention

The present invention is related to a face portion detecting apparatus in which a human face portion is irradiated by light and a desirable face portion is detected while suppressing an adverse influence made by a reflection image caused by an article having a luster reflection surface such as spectacles (glasses).

2. Description of the Related Art

Conventionally, various methods for detecting eye portions by using reflection images produced by irradiating near infrared rays have been widely utilized. For instance, Japanese Patent Laid-open No. 06-270711 discloses a method operated in such a manner that while the near infrared rays are irradiated to the human eyeball portion, the pupil region of the eyeball portion is detected, and then blinking actions are detected based upon the change of the shapes of this eyeball region.

FIG. 13 is, for example, a schematic block diagram of a conventional face portion detecting apparatus disclosed in Japanese Patent Laid-open No. 06-270711.

As indicated in FIG. 13, the eyeball portion of a car driver 112, which is illuminated by the light emitted from a light source 102, is photographed by a camera 101. A pupil extracting unit 106 extracts the pupil region of the eyeball portion from this photographed image, and then, the circular degree of this extracted pupil is measured by a circular degree measuring unit 107. Next, the shape change in this circular degree is recorded in a shape change recording unit 108, and an awaking condition judging unit 109 judges such a fact that the awaking condition of the car driver 112 is lowered based upon the shape change when both the blinking time duration and the blinking frequency are larger than, or equal to the given time/value. Then, when the awaking condition judging unit 109 judges that the awaking condition of the car driver 112 is lowered, a warning output unit 110 produces the warning sign.

Also, Japanese Patent Laid-open No. 09-081756 discloses the method operated in such a manner that a retina reflection image is extracted by a filtering processing, and this retina reflection image is reflected from the illumination which is arranged in the same axis as an optical axis of a photographing means.

FIG. 14 is, for example, a schematic block diagram for indicating an arrangement of another conventional face portion detecting apparatus disclosed in Japanese Patent Laid-open No. 09-081756.

As indicated in FIG. 14, this face portion detecting apparatus is arranged by a photographing unit A and an image processing unit B. In the case that the illuminance level of the portion located around a face is low by checking the output signal of an illuminance sensor 124, an illumination light 122 is irradiated to the facial region, and then, the image of the facial region is photographed by a camera 121. The acquired picture signal is A/D-converted by an A/D converting unit 126 into the digital picture signal, and then, the retina reflection image is extracted by performing the filtering processing in an image processing circuit 127, an image memory 128, and a CPU 133.

Furthermore, in the face portion detecting apparatus explained in Japanese Patent Laid-open No. 09-021611, since a predetermined angle is secured between the optical axis of an illumination means and the optical axis of a photographing means, adverse influences caused by the reflection of the spectacles or the like can be suppressed. The arrangement of this face portion detecting apparatus is substantially identical to that shown in FIG. 14.

On the other hand, Japanese Patent Laid-open No. 10-216234 discloses such a method that since the spectacles equipped with an infrared LED and a phototransistor is mounted on a human being, the blinking actions of the human being is detected so as to avoid that the human being falls into a doze.

In the above-explained detecting apparatus disclosed in Japanese Patent Laid-opens No. 06-270711 and No. 09-081756, however, in such a case that the human being wears spectacles, there are such possibilities that the eye portion cannot be correctly extracted due to the adverse influences caused by the reflection image, which occurs on the luster reflection surfaces of the spectacles.

This condition is represented in FIG. 15 and FIG. 16. As indicated in FIG. 15, when the image of the face to which an illumination light 102 is irradiated is photographed by a camera 101, there exists a reflection image 142 reflected from the lens surface of a spectacles 140 other than a retina reflection image 141 (See FIG. 16). As a result, there is a certain probability that the reflection image 142 reflected from the surface of the spectacle lens is erroneously detected as the retina reflection image.

Also, in the arrangement of the face portion detecting apparatus disclosed in Japanese Patent Laid-open No. 09-021611, since a given angle is secured between the optical axis of the photographing means and the optical axis of the illuminating means such that the adverse influences caused by such a reflection image reflected from the surface of the spectacle lens is intended to be suppressed. However, this suppression effect cannot be achieved, depending upon the angles of the head portion. Accordingly, there is such a possibility that the reflection image of the spectacles and the like appears in the image as illustrated in FIG. 16.

Furthermore, in the detecting apparatus disclosed in Japanese Patent Laid-open No. 10-216234, since the human being must wear the specific spectacles, the human being feels cumbersome, which is a problem.

SUMMARY OF THE INVENTION

The present invention has been made to solve the above-explained problems, and therefore, has an object to provide such a face portion detecting apparatus capable of firmly detecting a desired face portion even when a human being wears such an article having a luster reflection surface as spectacles or a helmet, while cumbersome operation of mounting a specific apparatus can be avoided.

To achieve the above-explained object, a face portion detecting apparatus according to the present invention is characterized in that the apparatus comprises: at least one illumination means for illuminating a face portion of a human being from different directions from each other; photographing means for photographing the face portion which is illuminated by the illumination means; illumination lighting control means for controlling turn-ON operation of the illumination means; photographing control means for controlling the photographing means in synchronism with the turn-ON operation of the illumination means; and face portion detecting means for removing a reflection image of an article having a luster reflection surface by employing at least one image which is acquired by the photographing means in synchronism with the turn-ON operation of the illumination means, whereby only a determined face portion is extracted.

In the face portion detecting apparatus according to the present invention, the face portion corresponds to an eye portion, and the face portion detecting means detects a retina reflection image which is formed by that the irradiation light of the illumination means is reflected on a retina of the human being.

In the face portion detecting apparatus according to the present invention, the illumination lighting control means turns ON a plurality of illumination means in a continuous manner; and while the face portion detecting means employs a plurality of images which are acquired by the photographing means in synchronism with the turn-ON operation of the illumination means, the face portion detecting means removes a reflection image whose reflection position is moved among the plurality of images as the reflection image of the article having the luster reflection surface.

In the face portion detecting apparatus according to the present invention, both the illumination lighting control means and the photographing control means synchronize turn-ON operation of at least the one illumination means with the photographic operation of the photographing means; the illumination lighting control means turns ON at least one illumination means while the photographing means photographs one image; and the face portion detecting means detects as the retina reflection image, such a reflection image which is present within a constant region among the images acquired by the photographing means, and the illuminance level of which is higher than, or equal to a predetermined value.

In the face portion detecting apparatus according to the present invention, at least a portion of the one illumination means is arranged within a range separated from an optical axis of the photographing means by a constant distance.

In the face portion detecting apparatus according to the present invention, at least one of the plurality of illumination means is arranged within a range separated from the optical axis of the photographing means by a constant distance.

In the face portion detecting apparatus according to the present invention, at least a portion of the one illumination means is arranged within a range separated from the optical axis of the photographing means by a constant distance, and the illumination means owns a predetermined shape; the illumination lighting control means turns ON the illumination means while one image is photographed; and the face portion detecting means detects as the retina reflection image, such a reflection image which is present within constant region among the images acquired by the photographing means, and the luminance level of which is higher than, or equal to a predetermined value, and furthermore, removes such a reflection image having a shape identical to the predetermined shape of the illumination means as the reflection image of the article having the luster reflection surface.

In the face portion detecting apparatus according to the present invention, at least one of the plurality of illumination means is arranged within a range separated from an optical axis of the photographing means by a constant distance, and the plurality of illumination means are arranged in such a manner that the plural illumination means constitute a predetermined shape; the illumination lighting control means turns ON the plurality of illumination means while one image is photographed; and the face portion detecting means detects as the retina reflection image, such a reflection image which is present within a constant region among the images acquired by the photographing means, and the luminance level of which is higher than, or equal to a predetermined value, and furthermore, removes such a reflection image having a shape identical to the predetermined shape of the plurality of illumination means as the reflection image of the article having the luster reflection surface.

In the face portion detecting apparatus according to the present invention, the predetermined shape of the illumination means is a straight-line shape.

In the face portion detecting apparatus according to the present invention, the predetermined shape of the illumination means is a coaxial shape with respect to the optical axis of the photographing means.

In the face portion detecting apparatus according to the present invention, the irradiation light of the illumination means corresponds to near infrared rays.

In the face portion detecting apparatus according to the present invention, the irradiation light of the illumination means corresponds to infrared rays.

BRIEF DESCRIPTION OF THE DRAWINGS

A better understanding of the present invention may be made by reading a detailed description in conjunction with the drawings, in which.

DETAILED DESCRIPTION OF THE PREFERRED EMBODIMENT

Referring now to drawings, a face portion detecting apparatus according to the present invention will be described in detail.

Embodiment 1

Figure 1:
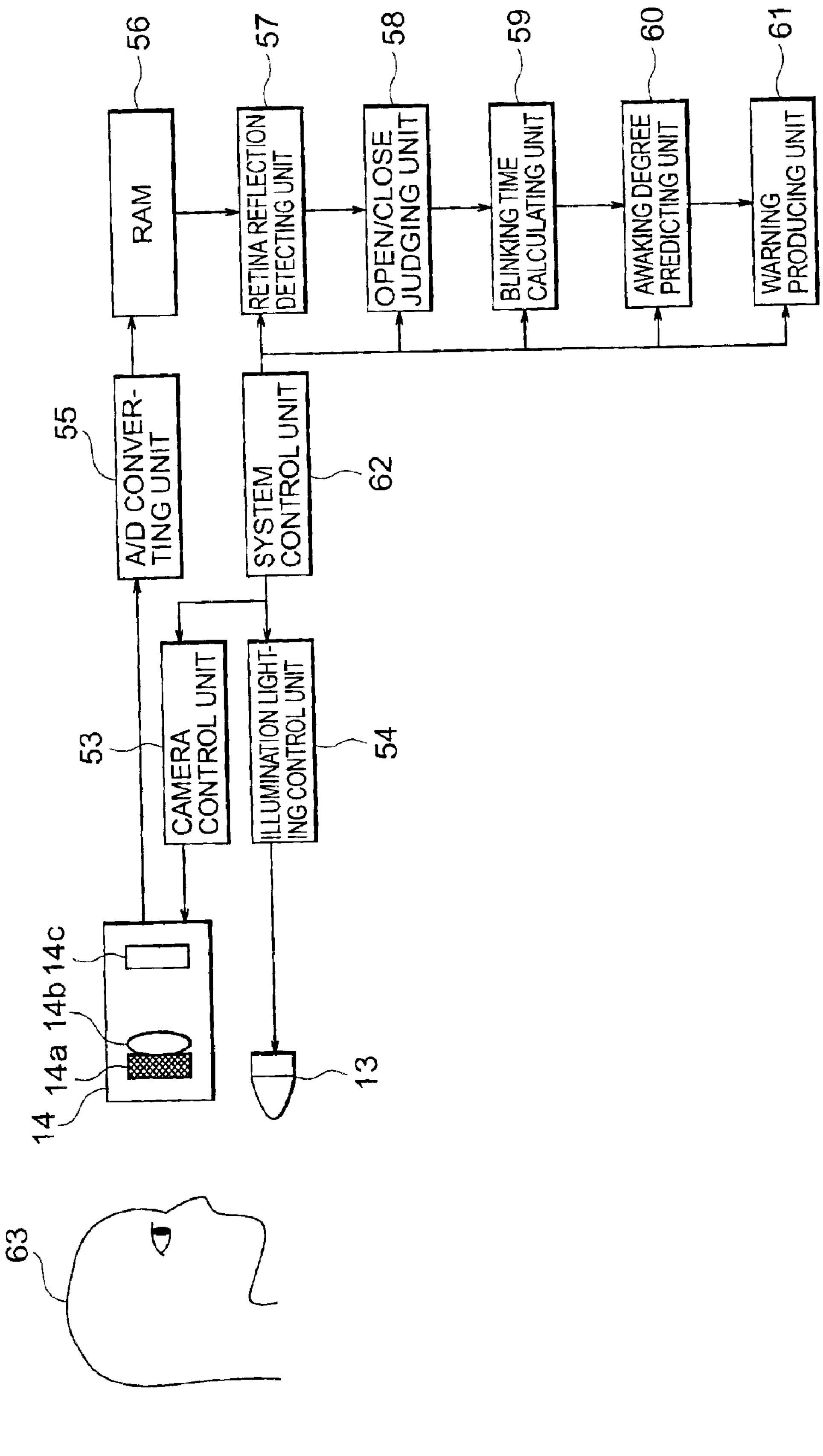
FIG. 1 is a schematic block diagram for showing an arrangement of a face portion detecting apparatus according to an embodiment 1 of the present invention.

First, a face portion detecting apparatus according to an embodiment 1 of the present invention will now be explained with reference to drawings. FIG. 1 schematically shows an overall arrangement of a face portion detecting apparatus according to the embodiment 1 of the present invention. It should be understood that the same reference numerals shown in the respective drawings denote the same or similar structural elements in the present invention.

In FIG. 1, reference numeral 14 shows a camera (photographing means). The camera 14 is composed of an optical filter 14*a*, a lens 14*b*, and a photographing element 14*c*. Also, reference numeral 13 shows a light source of an illumination (illumination means). Both the camera (photographing means) 14 and the illumination light source (illumination means) 13 are controlled by a camera control unit (photographing control means) 53 and an illumination lighting control unit (illumination lighting control means) 54, respectively. As will be explained later, plural illumination light sources 13 are installed.

Also, in this drawing, reference numeral 55 indicates an A/D converting unit for A/D-converting an analog image signal outputted from the camera 14, reference numeral 56 represents an RAM (random access memory) for storing thereinto the digital image data obtained by A/D-converting the analog image signal, and reference numeral 57 represents a retina reflection detecting unit (face portion detecting means) for detecting a retina reflection image by using the image data stored in this RAM 56. Also, reference numeral 58 denotes an open/close judging unit for judging open/close states of pupils by using the retina reflection image detected by the retina reflection detecting unit 57, reference numeral 59 shows a blinking time calculating unit for calculating a blinking time duration based upon the pupil-open/close-state judgement, and reference numeral 60 shows an awaking degree predicting unit for predicting an awaking degree of a car driver (will be explained later) by processing the calculated blinking time duration in a statistical manner. Further, reference numeral 61 indicates a warning producing unit for producing a warning sign in the case that this predicted awaking degree exceeds a predetermined threshold value, and reference numeral 62 represents a system control unit for controlling the above-described respective units defined from the camera control unit 53 to the warning producing unit 61. It should also be noted that reference numeral 63 shows a driver of a vehicle, whose awaking degree may be predicted by this face portion detecting apparatus (system) according to this embodiment 1.

Referring now to drawings, operations of the face portion detecting apparatus according to this embodiment 1 will be described.

First, image data around a face portion of the car driver 63 is outputted from the camera 14 by the camera control unit 53 in synchronization with the illumination light source 13 which is controlled by the illumination lighting control unit 54. In this camera 14, the optical filter 14*a* is provided in front of the lens 14*b*. This optical filter 14*a* may cause only the wavelength specific to the illumination light source 13 to pass therethrough, so that this optical filter 14*a* can suppress the adverse influence of the disturbance light other than the illumination light of the illumination light source 13.

The image data outputted from the camera 14 is converted into the digital image data by the A/D converting unit 55, and then, this digital image data is stored in the RAM 56. While using this image data stored in the RAM 56, a retina reflection image of the car driver 63 is detected in the retina reflection detecting unit 57, and then, while using this retina reflection image, open/close states of the pupils of this car driver 63 may be judged in the open/close judging unit 58.

Furthermore, in the blinking time calculating unit 59, a blinking time duration (namely, time duration during which pupils are closed) is calculated based on the open/close states of the pupils. The awaking degree predicting unit 60 processes this calculated blinking time duration in the statistical manner so as to predict an awaking degree of the car driver 63. When this predicted awaking degree exceeds a predetermined threshold value, the warning producing unit 61 produces a warning sign.

The statistical processing executed in the awaking degree predicting unit 60 indicates the processing below. That is, while a blinking time duration/count distribution is employed in which an abscissa indicates a blinking time duration and an ordinate denotes a frequency, such a blinking time duration/count distribution obtained when a car driver feels high awaking conditions just after this car driver starts to drive the car is compared with such a parameter as a standard deviation, a dispersion, and an average value, so that an awaking degree of the car driver 63 may be predicted.

As to warning signs made by the warning producing unit 61, warning sounds and voice warning notices may be employed which is not cumbersome to the car driver 63. Alternatively, when the face portion detecting apparatus is installed on a business-purposed truck, a voice warning sign may be produced, and at the same time, a face image of this truck driver 63 may be transferred to an operation management center or the like, so that an operation manager may finally confirm as to whether or not the awaking degree of this truck driver 63 is actually lowered.

Now, a description is made of a featured operation of the face portion detecting apparatus according to this embodiment 1.

In general, while a human being is located under dark illuminance environment, pupils of the human being are opened. Then, under this opened pupils condition, when infrared rays or the like are illuminated to the eyes of the human being, this illumination light is reflected on the retina, so that a retina reflection image is formed. FIG. 2 to FIG. 6 illustratively show a concrete structural example and a concrete image example in the case that this retina reflection image is formed.

Figure 2:
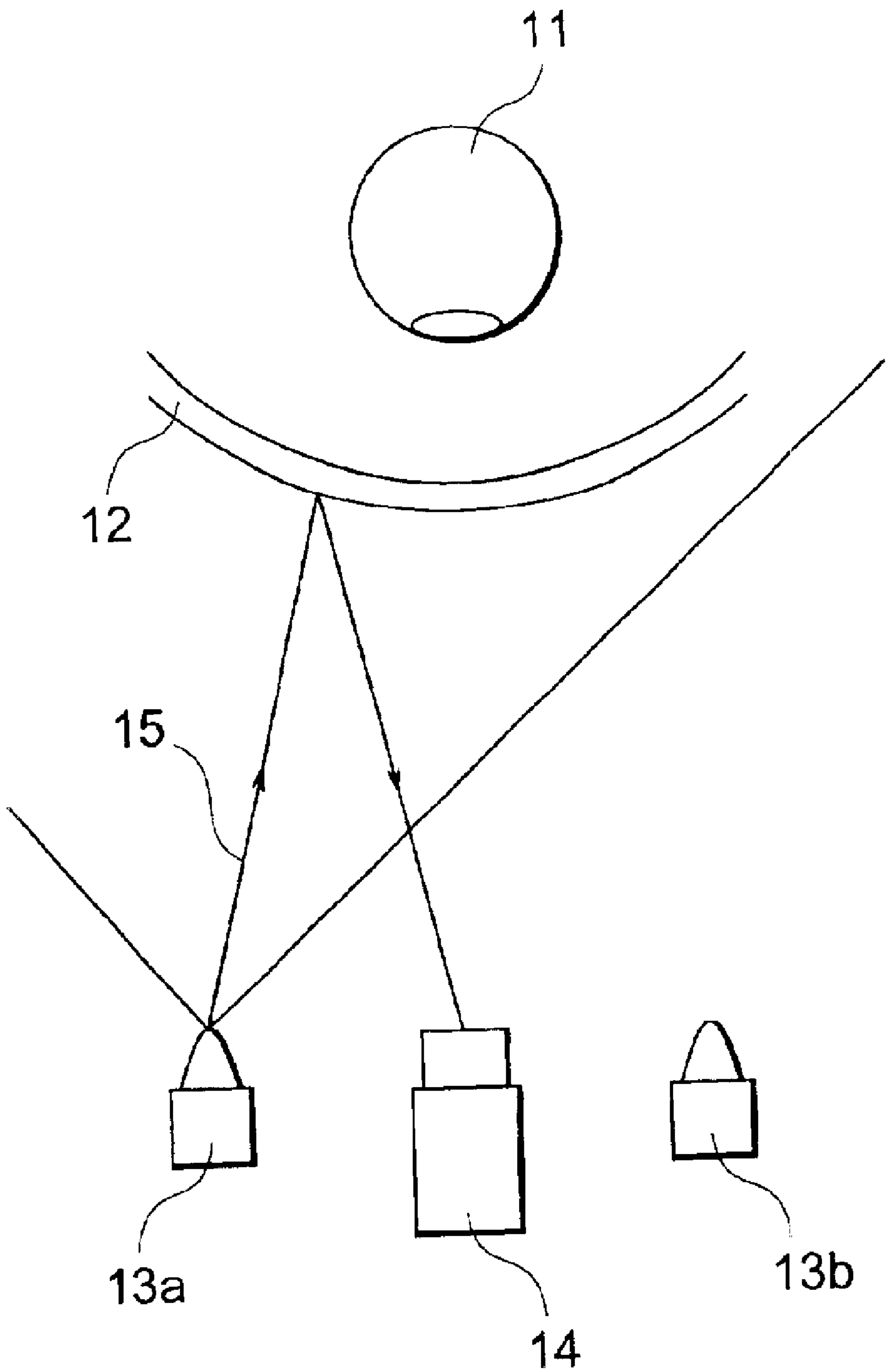
FIG. 2 is a diagram for illustratively showing a positional relationship between an illumination light source and a camera, employed in the face portion detecting apparatus according to the embodiment 1 of the present invention.

First, the structural example and the image example shown in FIG. 2 to FIG. 4 will now be explained. FIG. 2 illustratively shows a positional relationship among an eye of the car driver 63, a spectacle lens, an illumination light source, and a camera in the case that the car driver 63 corresponding to an object under examination who wears spectacles.

In FIG. 2, reference numeral 11 shows a bulb of the eye of the car driver 63, reference numeral 12 indicates a spectacle lens, reference numeral 13 (namely, 13*a* and 13*b*) denotes an illumination light source, and reference numeral 14 shows a camera. Also, reference numeral 15 indicates an optical path of illumination light when the left-side illumination light source 13*a* selected from the two illumination light sources 13*a* and 13*b* is turned ON.

Figure 3:
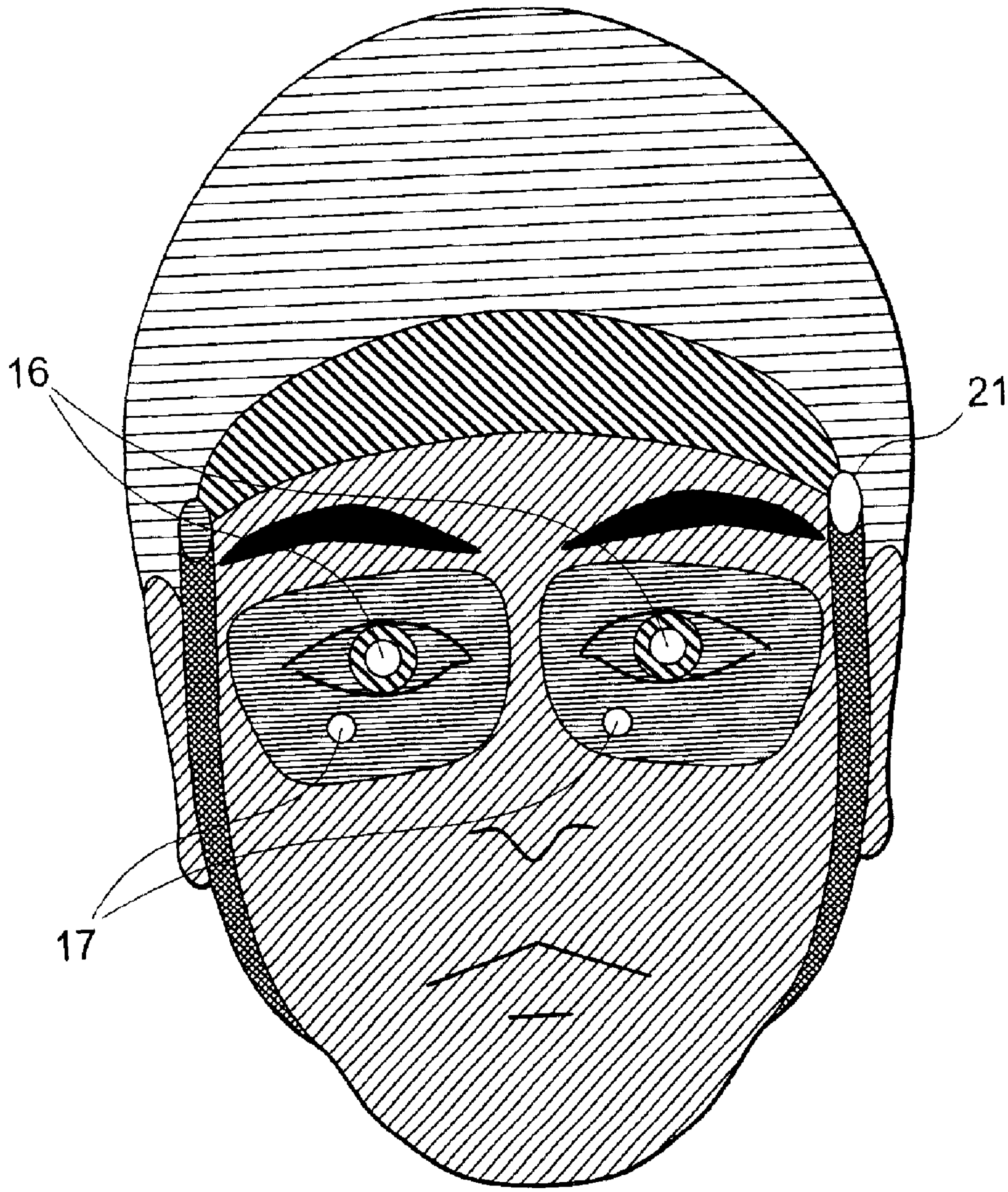
FIG. 3 is a diagram for illustratively showing an image example of a facial region when the left-side illumination light source is turned ON in the face portion detecting apparatus of FIG. 2.

FIG. 3 illustratively indicates an image example of a facial region of the car driver which is photographed by the camera 14 at this time. In FIG. 3, reference numeral 16 shows a retina reflection image which is formed by reflecting illumination light on the retina. Reference numeral 17 denotes a reflection image which is formed by reflecting illumination light on the spectacle lens 12. Also, reference numeral 21 represents a reflection image which is produced on a metal member of a helmet.

Figure 4:
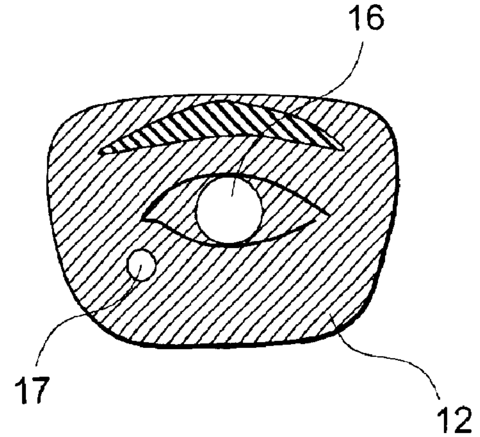
FIG. 4 is a diagram for illustratively showing an image of a face portion around a spectacle within the images captured by the camera when the left-side illumination light source is turned ON in the face portion detecting apparatus of FIG. 2.

Furthermore, FIG. 4 illustratively shows an example of such an image portion located near the eye of the car driver at this time.

As indicated in FIG. 2, when the left-side illumination light source 13*a* is turned ON under control of the illumination lighting control unit 54, the illumination light passes through the light path 15 and then is reflected on the spectacle lens 12, and thereafter, is entered into the camera 14 controlled in synchronism with the illumination light source 13*a* by the camera control unit 53. On the other hand, the illumination light penetrates through the pupil in the bulb of the eye 11, and is also reflected on the retina, and reflection light reflected from this retina again passes through the pupil and then is entered into the camera 14. As a result, the reflection image caused by the spectacle lens 12 is detected at a position "17" of FIG. 4, and the retina reflection image is detected at a position "16" of FIG. 4.

Figure 5:
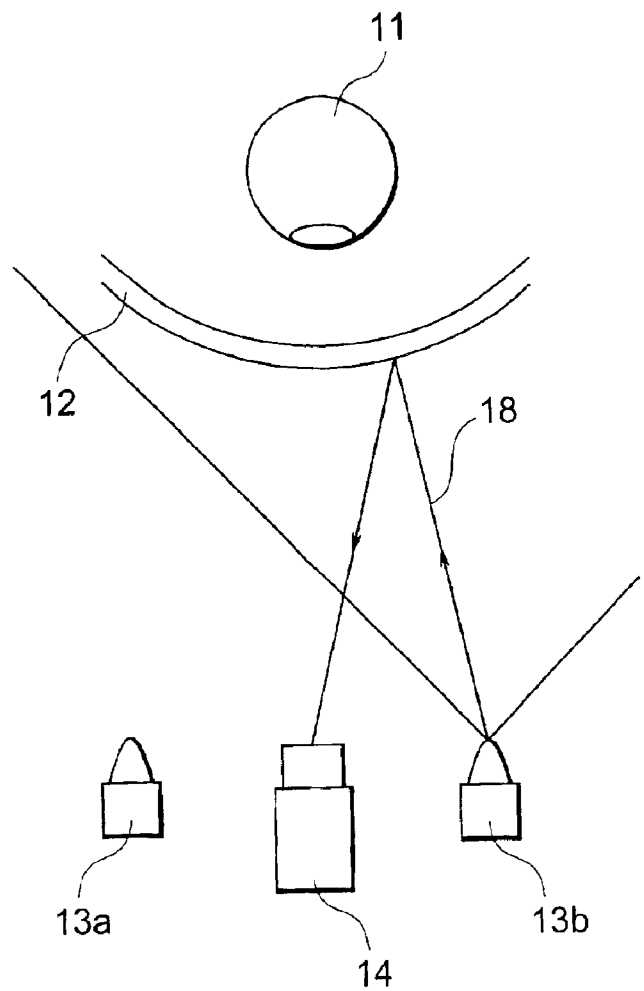
FIG. 5 is a diagram for illustratively showing another positional relationship between an illumination light source and a camera, employed in the face portion detecting apparatus according to the embodiment 1 of the present invention.
Figure 6:
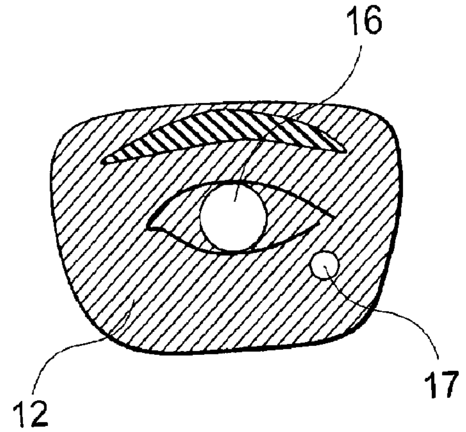
FIG. 6 is a diagram for illustratively showing an image of a face portion around the spectacle within the images captured by a camera when the right-side illumination light source is turned ON in the face portion detecting apparatus of FIG. 5.

Next, the structural example of FIG. 5 and the image example of FIG. 6 will now be explained. FIG. 5 is a diagram for illustratively showing such a structural example that the right-side illumination light source 13*b* is turned ON, which is selected from two illumination light sources 13*a* and 13*b*. FIG. 6 schematically shows an image example around the eye of the car driver 63 at this time.

In FIG. 5, reference numeral 18 shows an optical path of illumination light when the right-side illumination light source 13*b* is turned ON. At this time, a reflection image reflected on the surface of the spectacle lens 12 is detected at a position "17" of FIG. 6.

As indicated in FIG. 5, when the right-side illumination light source 13*b* is turned ON, the illumination light passes through the optical path 18, and then, is reflected on the spectacle lens 12, and thereafter, the reflection light is entered into the camera 14. On the other hand, the illumination light penetrates through the pupil in the bulb of the eye 11, and is also reflected on the retina, and reflection light reflected from this retina again passes through the pupil and then is entered into the camera 14. As a result, the reflection image caused by the spectacle lens 12 is detected at a position "17" of FIG. 6, and the retina reflection image is detected at a position "16" of FIG. 6 similarly to that of FIG. 4.

Even when the left-side illumination light source 13*a* is turned ON and also even if the right-side illumination light source 13*b* is turned ON, there is substantially no change in the positions of the retina reflection images as illustrated in the position "16" of FIG. 4 or the position "16" of FIG. 6. On the other hand, the reflection image reflected on the surface of the spectacle lens 12 is moved from the position "17" of FIG. 4 to the position "17 " 1 of FIG. 6. As explained above, this reflection image whose position is moved in the above-described manner can be judged as such a reflection image reflected on the luster reflection surface of the spectacles by the retina reflection detecting unit 57 based upon the two images so as to be removed, so that a retina reflection image as the object can be correctly detected.

It should be understood that a care should be slightly required in the arrangement of the illumination light source 13. The reason is given as follows: Since the light entered from the pupil is reflected on the retina and the light originated from the pupil is again monitored as the retina reflection image, if the illumination light source 13 is located very far from the optical axis of the camera 14, then the retina reflection image could not be confirmed by the camera 14.

For instance, in the case that a distance defined from the camera 14 to the face of the car driver 63 corresponding to the object to be imaged is equal to substantially 60 to 90 cm, the illumination light source 13 should be arranged at such a position within a distance ranging from approximately 5 cm to 10 cm.

Also, when such an illumination light source containing a visible light component is employed as the illumination light source 13 in the embodiment 1, this illumination light source disturbs the view field of the car driver 63 and further the pupils of the car driver 63 are closed, resulting in that the retina reflection image cannot be monitored. As a consequence, normally, such an illumination light source capable of irradiating either near infrared rays or infrared rays with the central wavelength of 850 nm to 950 nm may be employed as the illumination light source 13.

The face portion detecting apparatus according to the embodiment 1 equipped with a plurality of illumination light sources 13 for illuminating the face portion of the human being (car driver), from different directions and also the camera 14 for photographing the face portion illuminated by these illumination light sources 13, and is capable of detecting a predetermined face portion based upon the image data acquired from this camera 14. In this face portion detecting apparatus, while the plural illumination light sources 13 are turned ON, the reflection image of such an article having the luster reflection surface such as the spectacles is removed by employing a plurality of images which are acquired by the camera 14 operated in synchronism with turning-ON operation of this illumination light source 13, and thus, only a desirable face portion may be extracted.

In other words, in accordance with the face portion detecting apparatus of this embodiment 1, even in such a case that the car driver wears the article having the luster reflection surface such as the spectacles and the helmet, while a plurality of illumination light sources 13 are turned ON, the reflection image of such an article having the luster reflection surface such as the spectacles and the helmet is removed by employing a plurality of images which can be acquired by the camera 14 operated in synchronism with turning-ON operation of this illumination light source 13, and thus, only a desirable face portion of the car driver 63 may be extracted. Also, since the specific apparatus is no longer mounted on the human being (car driver) corresponding to the person to be examined, the human being need not conduct cumbersome operation.

Embodiment 2

Referring now to drawings, a description will be made of a face portion detecting apparatus according to an embodiment 2 of the present invention. It should be understood that an overall arrangement of this face portion detecting apparatus according to the embodiment 2 is similar to that of the face portion detecting apparatus according to the above-explained embodiment 1.

Figure 7:
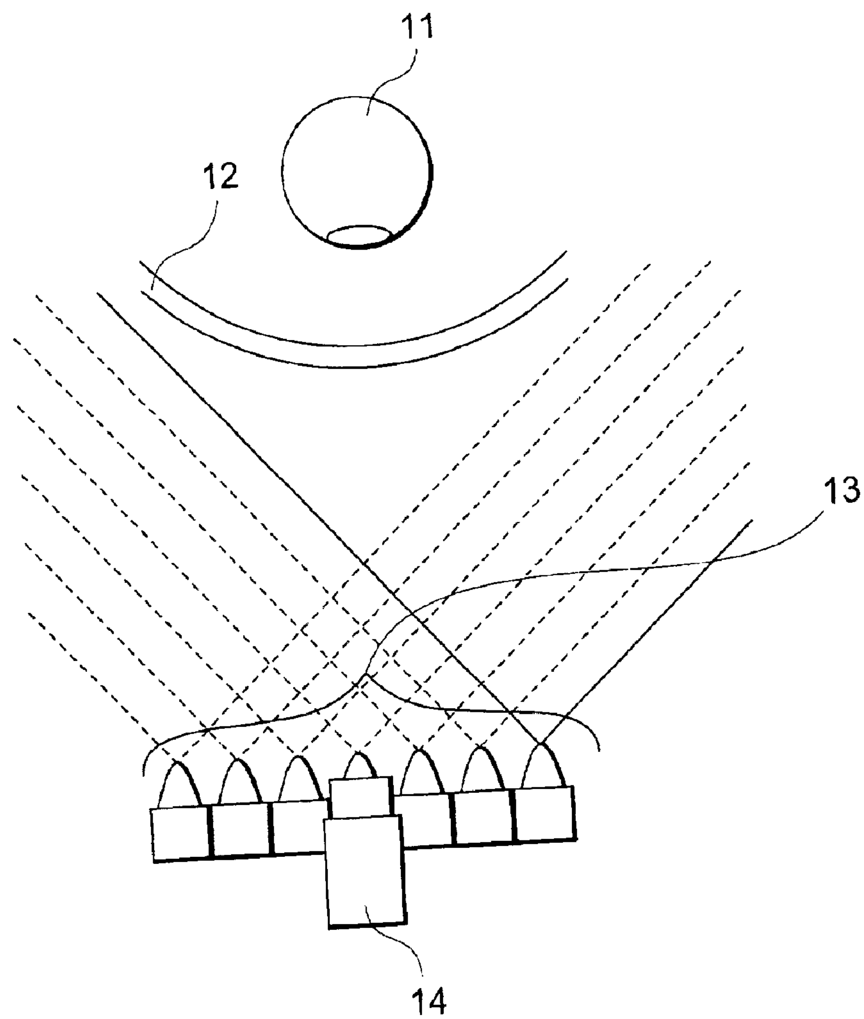
FIG. 7 is a diagram for illustratively showing a positional relationship between an illumination light source and a camera, employed in a face portion detecting apparatus according to an embodiment 2 of the present invention.
Figure 8:
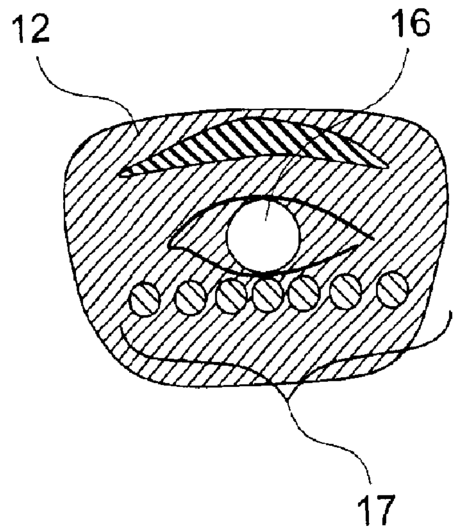
FIG. 8 is a diagram for illustratively showing an image of a face portion around the spectacle within the images captured by the camera in the face portion detecting apparatus of FIG. 7.

FIG. 7 and FIG. 8 illustratively show contents of the second embodiment 2 of the present invention. In this embodiment 2, two or more illumination light sources 13 are arranged on a straight line as illustrated in FIG. 7.

In FIG. 8, reference numeral 17 indicates a reflection image reflected on the surface of the spectacle lens 12 photographed by the camera 14.

In the case of FIG. 7, while a single image is photographed by the camera 14, a plurality of these illumination light sources 13 are continuously turned ON in either a sequential manner or a random manner in synchronism with the photographing operation by the camera 14.

Alternatively, while a single image is photographed by the camera 14, all of these plural illumination light sources 13 are turned ON at the same time in synchronism with the photographing operation.

In this case, as previously explained, when the illumination light sources 13 are arranged at positions located within several cm from the optical axis of the camera 14, since all the illumination light emitted from all of these illumination light sources 13 is reflected on the retina, retina reflection images can be monitored in high luminance levels (brightness levels) and also at the substantially same positions within the images photographed in the camera 14. On the other hand, reflection images which are reflected on the surface of the spectacle lens 12 are located at different positions within images photographed by the camera 14 with respect to the respective illumination light sources 13. In addition, since these reflection images are equal to such reflection images which are produced only by the illumination light of each of the illumination light sources 13, luminance levels of these reflection images are not so high.

As a result, the retina reflection images can be monitored in high luminance levels and also at the substantially same positions within the images photographed by the camera 14. On the other hand, since the positions of the reflection images reflected on the surface of the spectacle lens 12 are dispersed and the luminance levels of these reflection images are low, as compared with the above-explained luminance levels, only the retina reflection images can be detected by the retina reflection detecting unit 57 without having the adverse influences such as the reflections occurred on the surface of the spectacle lens 12.

It should also be noted that also in this embodiment 2, as previously described in the above-mentioned embodiment 1, normally, either an illumination light source capable of irradiating near infrared rays or an illumination light source capable of irradiating infrared rays may be employed as the illumination light sources 13.

Embodiment 3

Referring now to drawings, a description will be made of a face portion detecting apparatus according to an embodiment 3 of the present invention. It should be understood that an overall arrangement of this face portion detecting apparatus according to the embodiment 3 is similar to that of the face portion detecting apparatus according to the above-explained embodiment 1.

Figure 9:
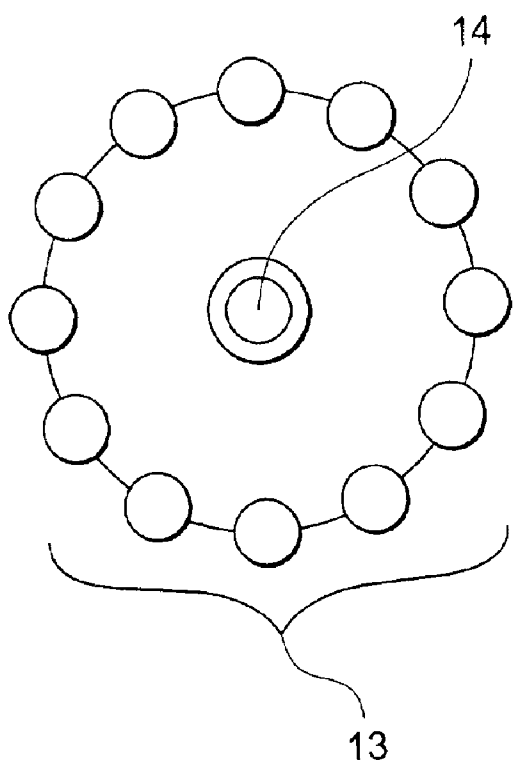
FIG. 9 is a diagram for illustratively showing a positional relationship between an illumination light source and a camera, employed in a face portion detecting apparatus according to an embodiment 3 of the present invention.
Figure 10:
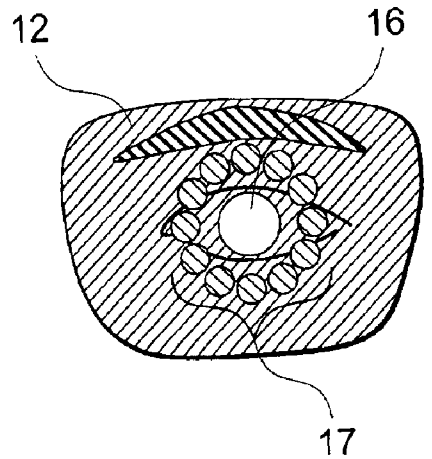
FIG. 10 is a diagram for illustratively showing an image of a face portion around the spectacle within the images captured by the camera in the face portion detecting apparatus of FIG. 9.

The illumination light sources 13 are arranged in the straight line form in the above-described embodiment 2, whereas a plurality of light sources 13 are arranged in a coaxial form with respect to the optical axis of the camera 14 in this embodiment 3. Referring now to FIG. 9 and FIG. 10, this face portion detecting apparatus of the embodiment 3 will be described.

FIG. 9 is a diagram for illustratively indicating a plurality of illumination light sources 13 and a camera 14, as viewed from a car driver. In FIG. 9, a plurality of illumination light sources 13 are arranged in a coaxial form with respect to the optical axis of the camera 14. FIG. 10 illustrates an image example of such an image located near a spectacle, which is photographed by the camera 14 at this time. The illumination light produced from a plurality of illumination light sources 13 which are arranged in such a coaxial form is reflected on the surface of the spectacle lens 12, and then is monitored as denoted by reference numeral 17 of FIG. 10 within the images photographed by the camera 14.

Both operations of the illumination light sources 13 and the camera 14 indicated in FIG. 9 are the substantially same as those of the above-explained embodiment 2. That is to say, while a single image is photographed by the camera 14, a plurality of illumination light sources 13 are turned ON in synchronism with the photographing operation.

Also, in this case, as previously explained, when all of the illumination light sources 13 are arranged at positions located within several cm from the optical axis of the camera 14, since all the illumination light emitted from all of these illumination light sources 13 are reflected on the retina, retina reflection images can be monitored in high luminance levels (brightness levels) and also at the substantially same positions within the images photographed by the camera 14. On the other hand, reflection images which are reflected on the surface of the spectacle lens 12 are located at different positions as indicated by “17” of FIG. 10 within images photographed by the camera 14 with respect to the respective illumination light sources 13. In addition, since these reflection images corresponds to such reflection images which are produced only by the illumination light of each of the illumination light sources 13, luminance levels of these reflection images are not so high.

Similarly to the above-explained embodiment 2, as a result, the retina reflection images can be monitored in high luminance levels and also at the substantially same positions within the images photographed by the camera 14. On the other hand, since the positions of the reflection images reflected on the surface of the spectacle lens 12 are dispersed and the luminance levels of these reflection images are low, as compared with the above-explained luminance levels, only the retina reflection images can be detected by the retina reflection detecting unit 57 without having the adverse influences such as the reflections occurred on the surface of the spectacle lens 12.

It should also be noted that also in this embodiment 3, as previously described in the above-mentioned embodiment 1, normally, either an illumination light source capable of irradiating near infrared rays or an illumination light source capable of irradiating infrared rays may be employed as the illumination light sources 13.

Embodiment 4

Referring now to drawings, a description will be made of a face portion detecting apparatus according to an embodiment 4 of the present invention. It should be understood that an overall arrangement of this face portion detecting apparatus according to the embodiment 4 is similar to that of the face portion detecting apparatus according to the above-explained embodiment 1.

Figure 11:
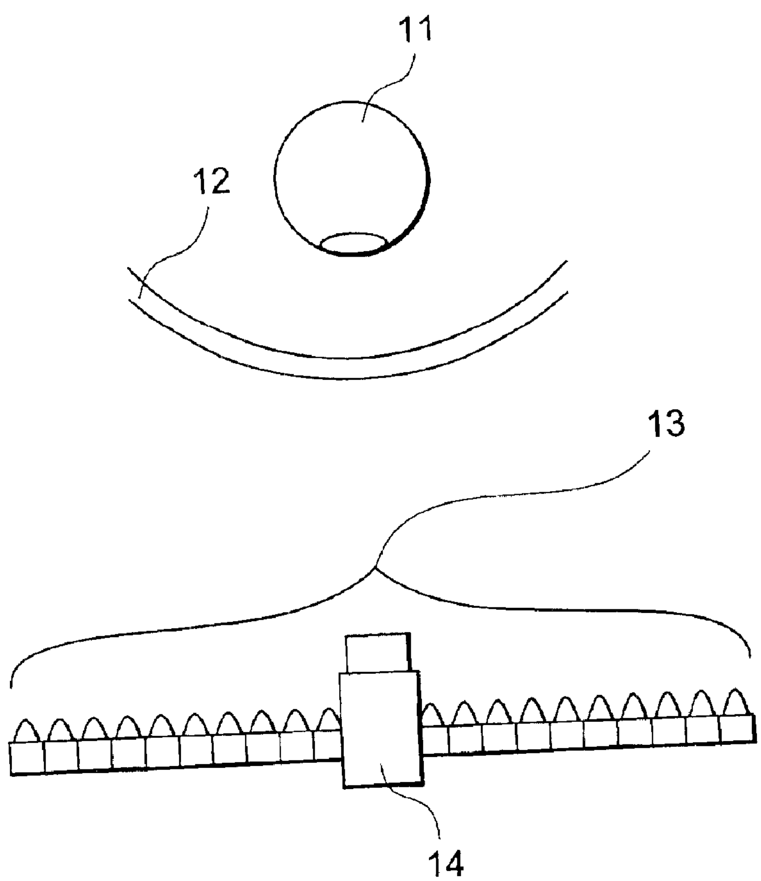
FIG. 11 is a diagram for illustratively showing a positional relationship between an illumination light source and a camera, employed in a face portion detecting apparatus according to an embodiment 4 of the present invention.
Figure 12:
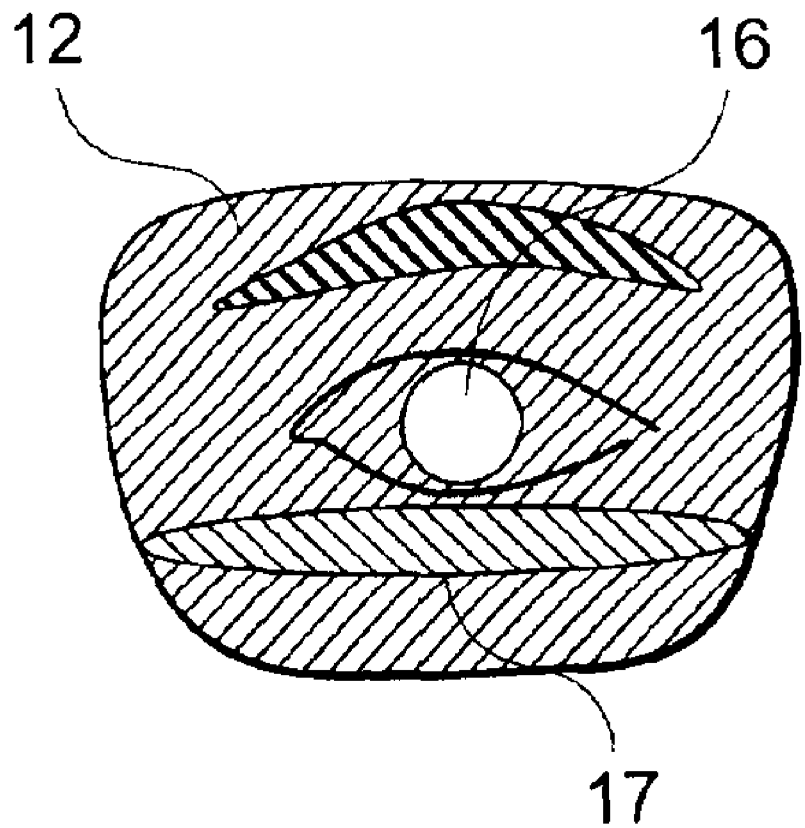
FIG. 12 is a diagram for illustratively showing an image of a face portion around the spectacle within the images captured by the camera in the face portion detecting apparatus of FIG. 11.
Figure 13:
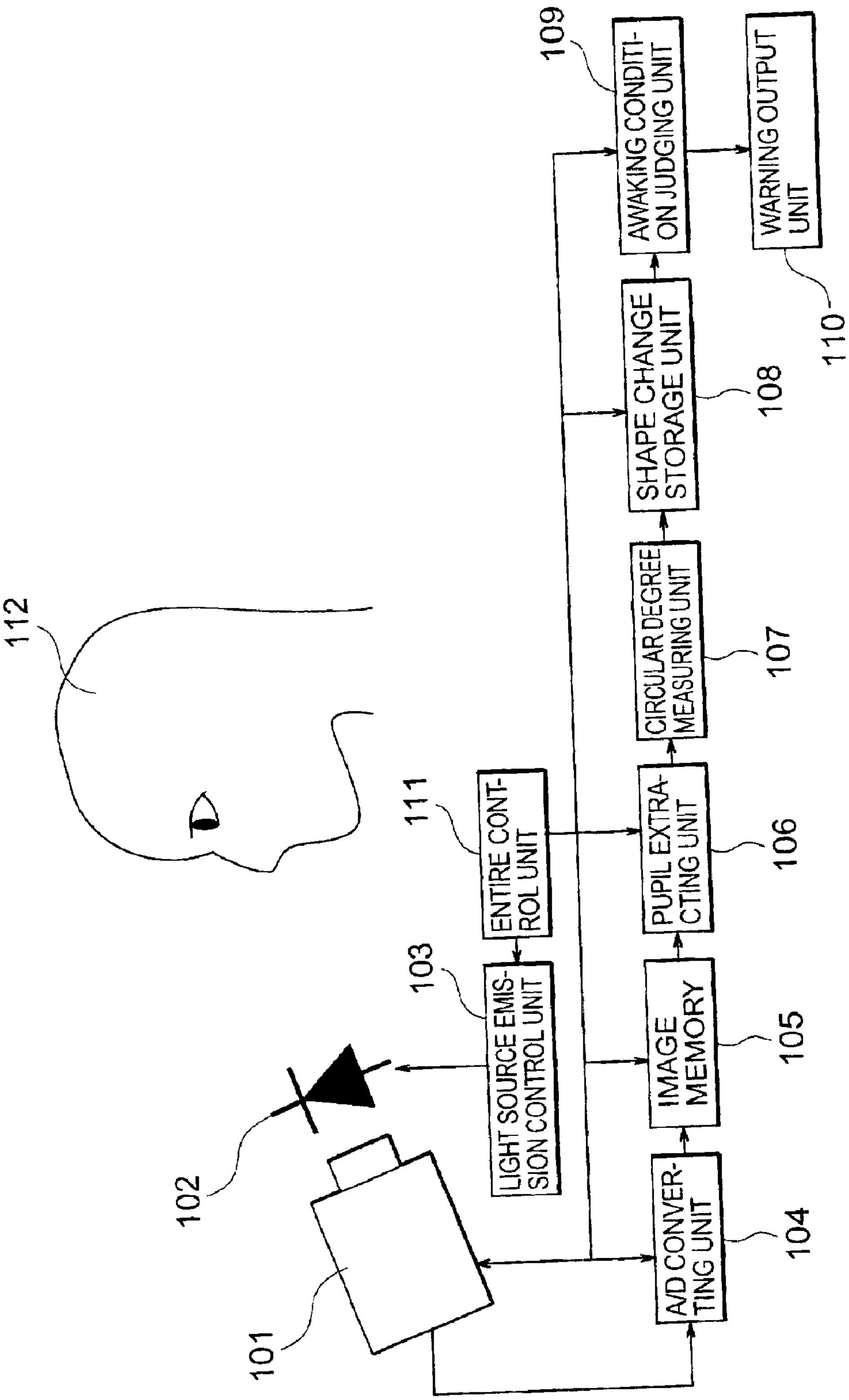
FIG. 13 is a schematic block diagram for showing the arrangement of a conventional face portion detecting apparatus.
Figure 14:
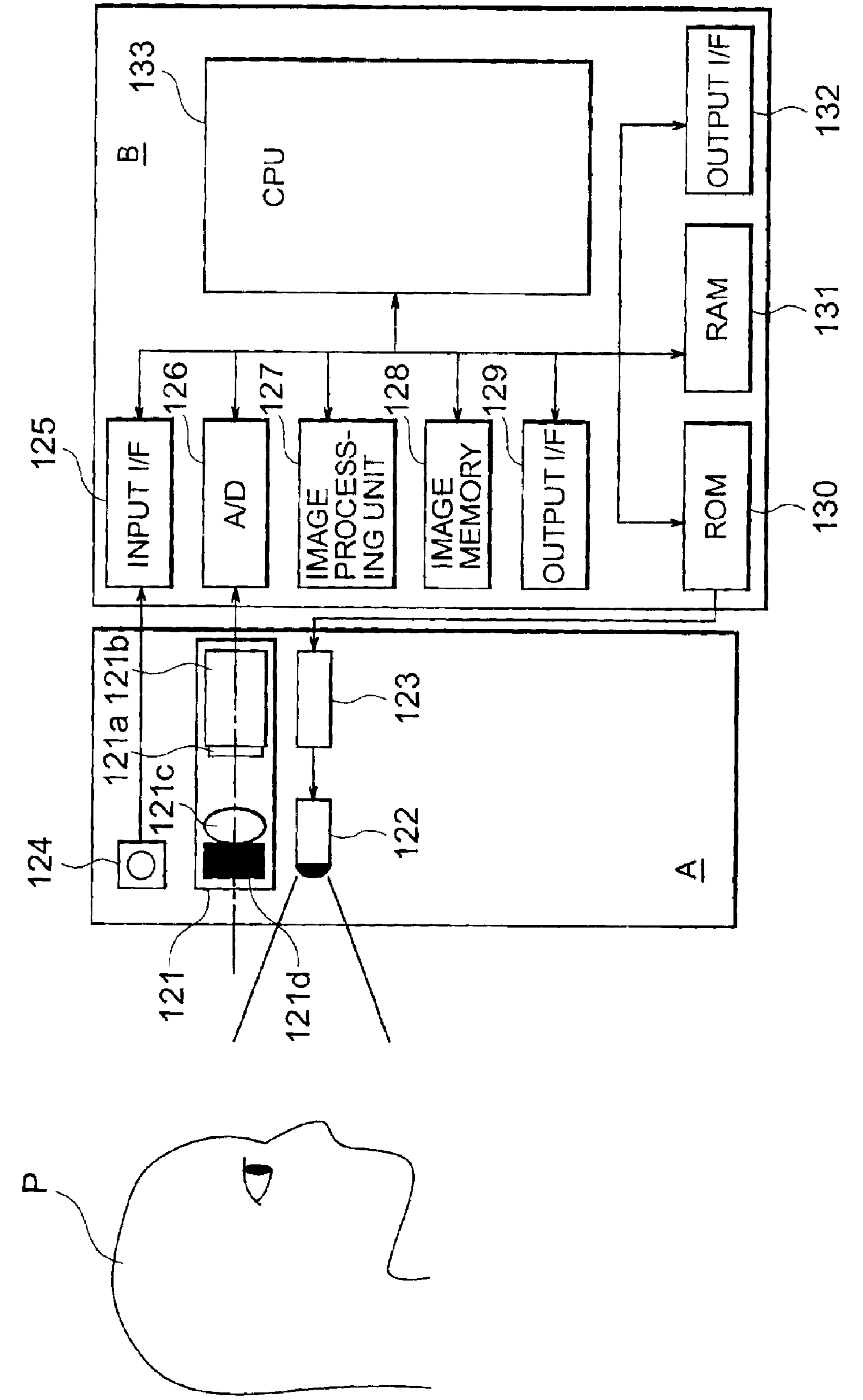
FIG. 14 is a schematic block diagram for showing the arrangement of another conventional face portion detecting apparatus.
Figure 15:
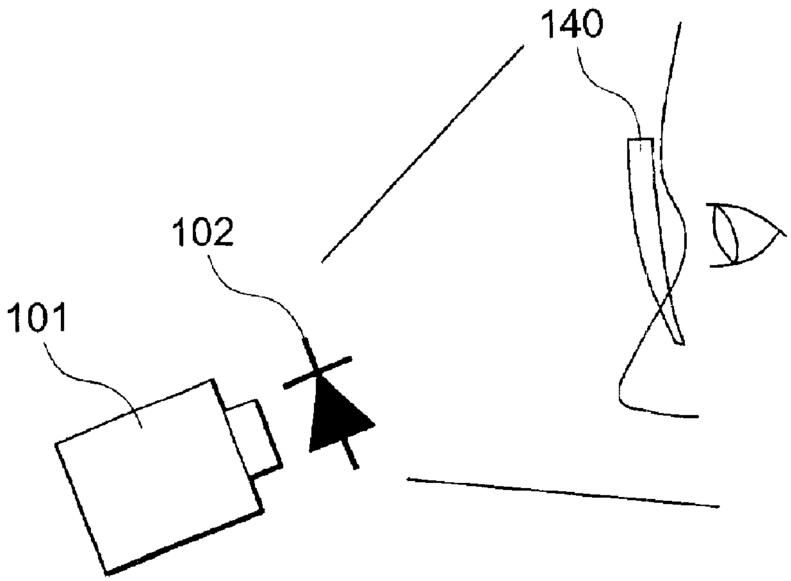
FIG. 15 is a diagram for illustratively showing a positional relationship among the illumination light source, the camera, and the human head portion in the case that the human being wears the spectacles in the conventional face portion detecting apparatus.
Figure 16:
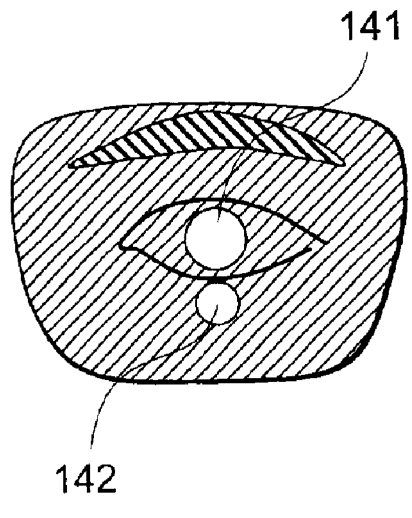
FIG. 16 is a diagram for illustratively showing the reflection image of the retina and the reflection image formed at the spectacle lens surface when the human being wears the spectacles in the conventional face portion detecting apparatus.

FIG. 11 and FIG. 12 illustratively show contents of the embodiment 4 of the present invention. In this embodiment 4, while each of illumination light sources provided in an illumination light source 13 is made smaller than the above-explained illumination light sources, pitches among the respective illumination light sources are made shorter than those of the above-explained embodiments. In addition, in accordance with this embodiment 4, the illumination light sources 13 are arranged along a straight line in such a manner that only a portion of these illumination light sources 13 is entered into a region separated from an optical axis of the camera 14 by approximately several cm.

FIG. 12 is an image example of a face portion of a car driver located near a spectacle, which is photographed by the camera 14 in the case that this illumination light source 13 is turned ON. Reference numeral 17 of FIG. 12 shows a reflection image which is produced in such a way that the illumination light originated from the illumination light source 13 is reflected on the surface of the spectacle lens 12.

It should also be noted that operations of the illumination light source 13 and the camera 14 indicated in FIG. 11 are basically similar to those of the above-explained embodiment 2. In other words, while a single image is photographed by the camera 14, the illumination light sources 13 are turned ON in synchronism with the photographing operation of the camera 14. At this time, only such illumination light emitted from the illumination light sources 13 which are located within the range separated from the optical axis of the camera 14 by approximately several cm is reflected from the retina. On the other hand, reflection images which are reflected from the surface of the spectral lens 12 are produced with respect to all of the illumination light sources 13, and as indicated by reference numeral "17" of FIG. 12, a shape of this reflection image is formed into a straight form corresponding to the arrangement shape of the illumination light sources 13. It should also be noted that retina reflection images are monitored at the substantially same positions within images which are photographed by the camera 14, and thus, luminance levels of these retina reflection images also come to be high, whereas since reflection images reflected from the surface of the spectacle lens 12 correspond to the respective illumination light sources 13 and positions of these reflection images are dispersed within the images, luminance levels of these reflection images are decreased.

As a result, the retina reflection image may be monitored as such a reflection image having a circular shape, whose luminance level is high. On the other hand, the reflection image reflected from the surface of the spectacle lens 12 may be monitored as such a reflection image elongated in a straight line, whose luminance level is low. As a consequence, the reflection image reflected from the surface of the spectacle lens 12 can be removed, and further, only the retina reflection image can be correctly detected by the retina reflection detecting unit 57.

It should also be noted that also in this embodiment 4, as previously described in the above-mentioned embodiment 1, normally, either an illumination light source capable of irradiating near infrared rays or an illumination light source capable of irradiating infrared rays may be employed as the illumination light sources 13.

Embodiment 5

In the above-described embodiments 1 to 4, the following descriptions have been made. That is, the face portion to be detected is the eye portion of the car driver, and the retina reflection images are detected. Alternatively, the detecting method of the present invention may be effectively utilized also in such a case that an eye portion may be detected without utilizing such a retina reflection image.

The reason is given as follows: Even when the eye portion is detected without using the retina reflection image, the reflection images produced from the surface of the spectacle lens 12 may disturb the detecting operation of the eye portion. In this alternative case, contrary to the above-explained embodiments, a plurality of illumination light sources 13 are arranged at such positions separated from the optical axis of the camera 14 longer than, or equal to a given distance so that such a retina reflection image is not formed. It should also be noted that an arranging form of the illumination light sources 13, a turning-ON method of these illumination light sources 13, and a photographing method of images are similar to those of the previously explained embodiments.

As a result, a reflection image generated on the surface of the spectacle lens 12 or the like may be easily removed by executing an image processing, while utilizing such a fact that the position of this reflection image is changed, or the shape of this reflection image becomes similar to the arranging form of the illumination light sources. As a consequence, the target eye portion may be properly detected without the adverse influence caused by the reflections occurred on the surface of the spectacle lens.

What is claimed is:

1. A face portion detecting apparatus comprising:

at least one illumination means for illuminating a face portion of a human being from different directions from each other;

photographing means for photographing the face portion which is illuminated by said illumination means;

illumination lighting control means for controlling turn-ON operation of said illumination means;

photographing control means for controlling said photographing means in synchronism with the turn-ON operation of said illumination means; and face portion detecting means for removing a reflection image of an article having a luster reflection surface by employing at least one image which is acquired by said photographing means in synchronism with the turn-ON operation of said illumination means, whereby only a determined face portion is extracted;

wherein:

said illumination lighting control means turns ON a plurality of illumination means in a continuous manner; and while said face portion detecting means employs a plurality of images which are acquired by said photographing means in synchronism with the turn-ON operation of said illumination means, said face portion detecting means removes a reflection image whose reflection position is moved among said plurality of images as the reflection image of the article having the luster reflection surface.

2. A face portion detecting apparatus according to claim 1 wherein:

said face portion corresponds to an eye portion, and said face portion detecting means detects a retina reflection image which is formed by that the irradiation light of said illumination means is reflected on a retina of the human being.

3. A face portion detecting apparatus according to claim 1 wherein:

at least a portion of said one illumination means is arranged within a range separated from an optical axis of said photographing means by a constant distance.

4. A face portion detecting apparatus according to claim 1 wherein:

at least one of said plurality of illumination means is arranged within range separated from the optical axis of said photographing means by a constant distance.

5. A face portion detecting apparatus according to claim 1 wherein:

the irradiation light of said illumination means corresponds to near infrared rays.

6. A face portion detecting apparatus according to claim 1 wherein:

the irradiation light of said illumination means corresponds to infrared rays.

7. A face portion detecting apparatus comprising:

at least one illumination means for illuminating a face portion of a human being from different directions from each other;

photographing means for photographing the face portion which is illuminated by said illumination means;

illumination lighting control means for controlling turn-ON operation of said illumination means;

photographing control means for controlling said photographing means in synchronism with the turn-ON operation of said illumination means; and face portion detecting means for removing a reflection image of an article having a luster reflection surface by employing at least one image which is acquired by said photographing means in synchronism with the turn-ON operation of said illumination means, whereby only a determined face portion is extracted;

wherein:

said face portion corresponds to an eye portion;

said face portion detecting means detects a retina reflection image which is formed by that the irradiation light of said illumination means is reflected on a retina of the human being;

both the illumination lighting control means and the photographing control means synchronize turn-ON operation of at least said one illumination means with th photographic operation of said photographing operation;

said illumination lighting control means turns ON at least one illumination means while said photographing means photographs one image; and said face portion detecting means detects as the retina reflection image, such a reflection image which is present within a constant region among the images acquired by said photographing means, and an illuminance level of which is higher than, or equal to a predetermined value.

8. A face portion detecting apparatus comprising:

at least one illumination means for illuminating a face portion of a human being from different directions from each other;

photographing means for photographing the face portion which is illuminated by said illumination means;

illumination lighting control means for controlling turn-ON operation of said illumination means;

photographing control means for controlling said photographing means in synchronism with the turn-ON operation of said illumination means; and face portion detecting means for removing a reflection image of an article having a luster reflection surface by employing at least one image which is acquired by said photographing means in synchronism with the turn-ON operation of said illumination means, whereby only a determined face portion is extracted;

wherein:

said face portion corresponds to an eye portion;

said face portion detecting means detects a retina reflection image which is formed by that the irradiation light of said illumination means is reflected on a retina of the human being;

at least a portion of said one illumination means is arranged within a range separated from the optical axis of said photographing means by a constant distance, and said illumination means owns a predetermined shape;

said illumination lighting control means turns ON said illumination means while one image is photographed; and said face portion detecting means detects as the retina reflection image, such a reflection image which is present within constant region among the images acquired by said photographing means, and the luminance level of which is higher than, or equal to a predetermined value, and furthermore, removes such a reflection image having a shape identical to said predetermined shape of said illumination means as the reflection image of the article having the luster reflection surface.

9. A face portion detecting apparatus according to claim 8 wherein:

said predetermined shape of the illumination means is a straight-line shape.

10. A face portion detecting apparatus according to claim 8 wherein:

said predetermined shape of the illumination means is a coaxial shape with respect to the optical axis of said photographing means.

11. A face portion detecting apparatus comprising:

at least one illumination means for illuminating a face portion of a human being from different directions from each other;

photographing means for photographing the face portion which is illuminated by said illumination means;

illumination lighting control means for controlling turn-ON operation of said illumination means;

photographing control means for controlling said photographing means in synchronism with the turn-ON operation of said illumination means; and face portion detecting means for removing a reflection image of an article having a luster reflection surface by employing at least one image which is acquired by said photographing means in synchronism with the turn-ON operation of said illumination means, whereby only a determined face portion is extracted;

wherein:

said face portion corresponds to an eye portion;

said face portion detecting means detects a retina reflection image which is formed by that the irradiation light of said illumination means is reflected on a retina of the human being;

at least one of said plurality of illumination means is arranged within range separated from an optical axis of said photographing means by a constant distance, and said plurality of illumination means are arranged in such a manner that said plural illumination means constitute a predetermined shape;

said illumination lighting control means turns ON said plurality of illumination means while one image is photographed; and said face portion detecting means detects as the retina reflection image, such a reflection image which is present within a constant region among the images acquired by said photographing means, and the luminance level of which is higher than, or equal to a predetermined value, and furthermore, removes such a reflection image having a shape identical to said predetermined shape of said plurality of illumination means as the reflection image of the article having the luster reflection surface.

* * * * *